US012664470B2

(12) United States Patent (10) Patent No.: US 12,664,470 B2
Agravante et al. (45) Date of Patent: Jun. 23, 2026

(54) ENABLING CLASSICAL PLANNING IN INTERACTIVE ENVIRONMENTS WITH INCOMPLETE MODELS

(71) Applicant: INTERNATIONAL BUSINESS MACHINES CORPORATION, Armonk, NY (US)

(72) Inventors: Don Joven Ravoy Agravante, Tokyo (JP); Michiaki Tatsubori, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 807 days.

(21) Appl. No.: 18/066,270

(22) Filed: Dec. 14, 2022

(65) Prior Publication Data

US 2024/0202570 A1 Jun. 20, 2024

(51) Int. Cl.
*G06N 20/00* (2019.01)
(52) U.S. Cl.
CPC .................................... *G06N 20/00* (2019.01)
(58) Field of Classification Search
CPC ........... G06N 20/00; G06N 3/006; G06N 7/01
See application file for complete search history.

(56) References Cited

U.S. PATENT DOCUMENTS

2017/0213150 A1* 7/2017 Arel ........................ G06N 3/042
2020/0320435 A1* 10/2020 Sequeira .................. G06N 5/04

2022/0147876 A1* 5/2022 Dalli ...................... G06N 20/00
2022/0309383 A1 9/2022 Sautier et al.
2025/0028968 A1* 1/2025 Espinós Longa ...... G06N 3/084

FOREIGN PATENT DOCUMENTS

CN 112329948 A 2/2021

OTHER PUBLICATIONS

Bertoli, P. et al., "Strong Planning Under Partial Observability"; Artificial Intelligence (2006), vol. 170, pp. 337-384.
Bonet, B. et al., "Planning under Partial Observability by Classical Replanning: Theory and Experiments"; Proceedings of the Twenty-Second International Joint Conference on Artificial Intelligence (2000); 6 pgs.

(Continued)

*Primary Examiner* — Dave Misir
(74) *Attorney, Agent, or Firm* — CHIP LAW GROUP

(57) ABSTRACT

A computer-implemented method in a model-based reinforcement learning (RL) system with logic states includes switching an agent between a first mode and a second mode, the first mode being a probabilistic planning mode and the second mode being an information gathering mode. In response to the agent being in the probabilistic planning mode, the agent computes a predictive state representation, given a history of observations and actions taken, and the agent scores action candidates based on planning with the predictive state representation so that actions with resolved plans with confidence to achieve a goal state are scored higher than actions without resolved plans. In response to the agent being in the information gathering mode, the agent scores action candidates based on a Q function of a value of expected information to be gathered from a given pair of state and action.

19 Claims, 8 Drawing Sheets

(56) References Cited

OTHER PUBLICATIONS

Brafman, R. I. et al., "Replanning in Domains with Partial Information and Sensing Actions", Journal of Artificial Intelligence Research (2012), vol. 45, pp. 565-600.

Kaelbling, L. P. et al., "Planning and Acting in Partially Observable Stochastic Domains", Artificial Intelligence (1998), vol. 101, pp. 99-134.

Karkus, P. et al., "QMDP-Net: Deep Learning for Planning under Partial Observability", 31st Conference on Neural Information Processing Systems (NIPS 2017), 11 pgs.

Li, T. et al., "Efficient Planning under Partial Observability with Unnormalized Q Functions and Spectral Learning", Proceedings of the 23rd International Conference on Artificial Intelligence and Statistics (2020), 10 pgs.

Narasimhan, K. et al., "Language Understanding for Text-based Games using Deep Reinforcement Learning", arXiv:1506.08941v2 [cs.CL] (2015); 11 pgs.

Ho, H. N. et al., "Model-based Reinforcement Learning Approach for Planning in Self-Adaptive Software System", IMCOM (2015), 8 pgs.

Hefny, A. et al., "Recurrent Predictive State Policy Networks", Proceedings of the 35th International Conference on Machine Learning (2018); 16 pgs.

Gehring, C. et al., "Reinforcement Learning for Classical Planning: Viewing Heuristics as Dense Reward Generators", arXiv:2109.14830v2 [cs.AI] (2022), 14 pgs.

Wang, Y. et al., "Reinforcement Learning with Temporal Logic Constraints for Partially-Observable Markov Decision Processes", arXiv:2104.01612v1 [cs.RO] (2021), 6 pgs.

Araki, B., et al., "The Logical Options Framework", arXiv:2102.12571v1 [cs.AI] (2021), 23 pgs.

Pandey, B. et al., "Planning for Partial Observability by SAT and Graph Constraints", Association for the Advancement of Artificial (2018), 9 pgs.

Pineau, J. et al., A Hierarchical Approach to POMDP Planning and Execution:, Robotics Institute, School of Computer Science, Pittsburgh, PA (2001), 5 pgs.

Yang, S. et al., A Hybrid Planning Approach for Accompanying Information-gathering in Plan Execution Monitoring:, Journal of Intelligent & Robotic Systems (2021), vol. 103:19, 16 pgs.

Ma, et al., "Information Gathering and Reward Exploitation of Subgoals for POMDPs", Twenty-Ninth AAAI Conference on Artificial Intelligence, Mar. 4, 2015, 7 Pages.

Ross, et al., "Online Planning Algorithms for POMDPs", Journal of Artificial Intelligence Research 32, Jul. 1, 2008, 42 Pages.

* cited by examiner

700

702 — TRAINING AN AGENT WITH A CLASSICAL PLANNING POLICY

704 — PROVIDING AN INFORMATION GATHERING POLICY

706 — SWITCHING BETWEEN THE CLASSICAL PLANNING MODE AND THE INFORMATION GATHERING MODE

708 — LEARNING/UPDATING ACTION MODELS USING PREVIOUS INTERACTIONS WITH THE ENVIRONMENT

710 — LEARNING, WITH A Q-LEARNING ALGORITHM A VALUE FUNCTION THAT SCORES STATE-ACTION PAIRS

800

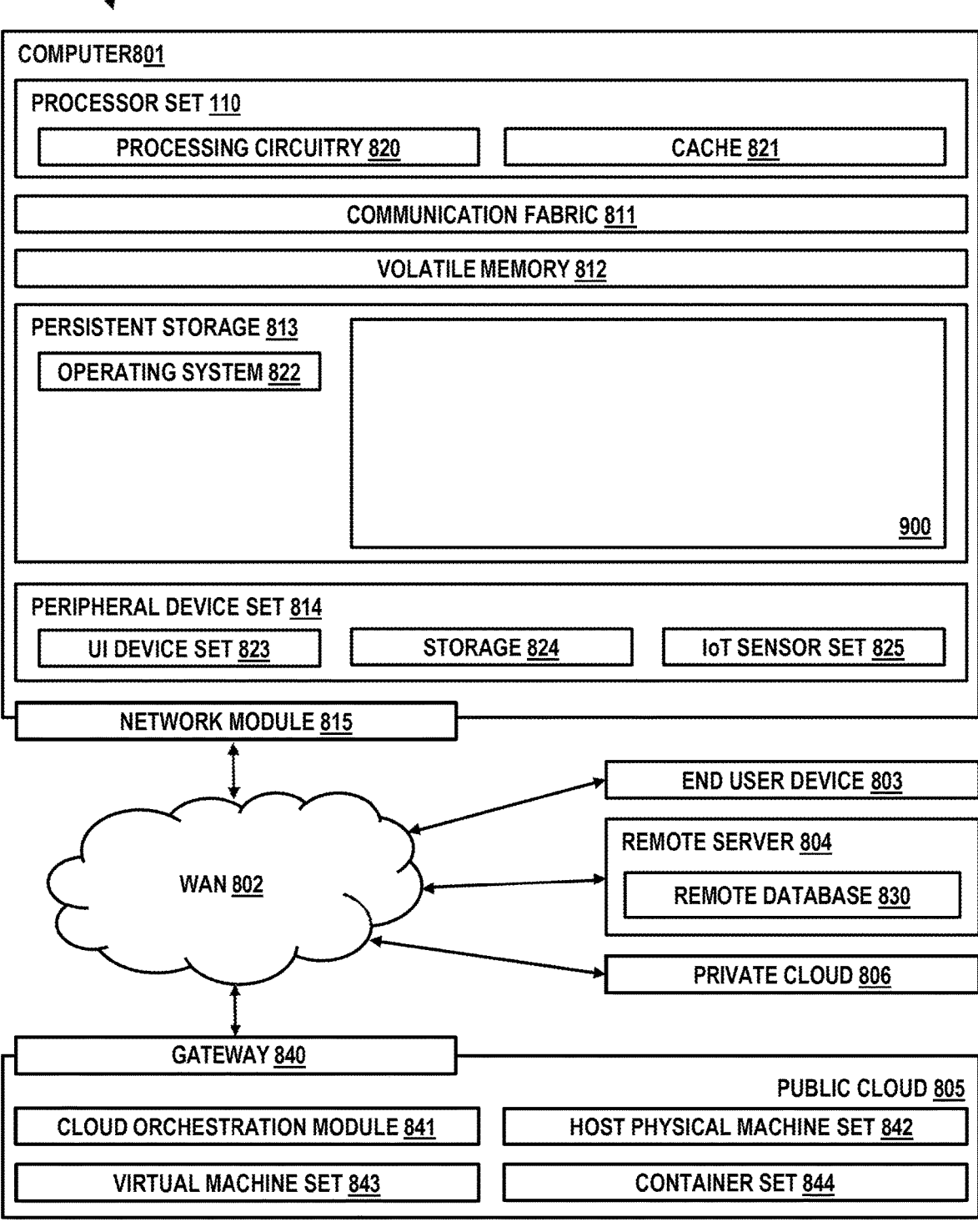

COMPUTER801

PROCESSOR SET 110

PROCESSING CIRCUITRY 820

CACHE 821

COMMUNICATION FABRIC 811

VOLATILE MEMORY 812

PERSISTENT STORAGE 813

OPERATING SYSTEM 822

900

PERIPHERAL DEVICE SET 814

UI DEVICE SET 823

STORAGE 824

IoT SENSOR SET 825

NETWORK MODULE 815

WAN 802

END USER DEVICE 803

REMOTE SERVER 804

REMOTE DATABASE 830

PRIVATE CLOUD 806

GATEWAY 840

PUBLIC CLOUD 805

CLOUD ORCHESTRATION MODULE 841

HOST PHYSICAL MACHINE SET 842

VIRTUAL MACHINE SET 843

CONTAINER SET 844

FIG. 8

ENABLING CLASSICAL PLANNING IN INTERACTIVE ENVIRONMENTS WITH INCOMPLETE MODELS

BACKGROUND

Technical Field

The present disclosure generally relates to machine learning technology, and more particularly, to a computer-implemented method, a computer system, and a computer program product for enabling classical planning in interactive environments with incomplete models.

Description of the Related Art

In many real-world applications, the environment of an artificial intelligent (AI) agent is often partially observable—the true state of the system is not completely visible.

Reinforcement learning is the machine learning paradigm where an agent learns the best way to interact with an environment by taking actions and observing the results of the actions. Recent research has shifted to deep learning with model-based reinforcement learning in order to improve data efficiency. The philosophy of the approach is to first learn a model of the environment dynamics and then to plan over this model. The model-based reinforcement learning has produced significant state-of-the-art results in recent years. However, current models are still opaque and difficult to integrate with external knowledge bases.

A planning problem is a task of generating action sequences for execution by an agent that is guaranteed to generate a state containing desired goals. In the planning problem, once an operator, which is a definition of an action's preconditions and effects, is defined, a problem can be solved in a variety of application area, by using planners.

SUMMARY

In one embodiment, a computer-implemented method in a model-based reinforcement learning (RL) system with logic states includes switching an agent between two modes, a first mode and a second mode, the first mode being a probabilistic planning mode and the second mode being an information gathering mode. In response to the agent being in the probabilistic planning mode, the agent computes a predictive state representation, given a history of observations and actions taken, and the agent scores action candidates based on planning with the predictive state representation so that actions with resolved plans with confidence to achieve a goal state are scored higher than actions without resolved plans. In response to the agent being in the information gathering mode, the agent scores action candidates based on a Q function of a value of expected information to be gathered from a given pair of state and action.

In one embodiment, a method for planning in interactive environments with partial observability and incomplete models includes producing, with a classical planning algorithm, a path from a given initial state to a goal state in response to a model of a world being known to an agent. The method further includes taking action to increase knowledge about a current state of the world with an information gathering policy trained to take actions that increase knowledge about the current state of the world and switching, with an online replanning framework, between using the classical planning algorithm and using the information gathering policy based on a current model of the world.

By virtue of the concepts discussed herein, methods for enabling planning in interactive environments with partial observability and incomplete models are provided that provides an artificial intelligent agent with an information gathering policy that can help the agent reach a goal state, even when the information needed for classical planning is not observable by the agent. Such a system improves conventional reinforcement learning algorithms implemented on a computing platform by providing rewards to the agent for information gathering, where such information gathering moves the agent toward reaching its goal state.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 8 is a functional block diagram illustration of a computer hardware platform that can be used to implement the method for enabling classical planning in an interactive environment with incomplete models, according to an illustrative embodiment.

DETAILED DESCRIPTION

Figure 1:
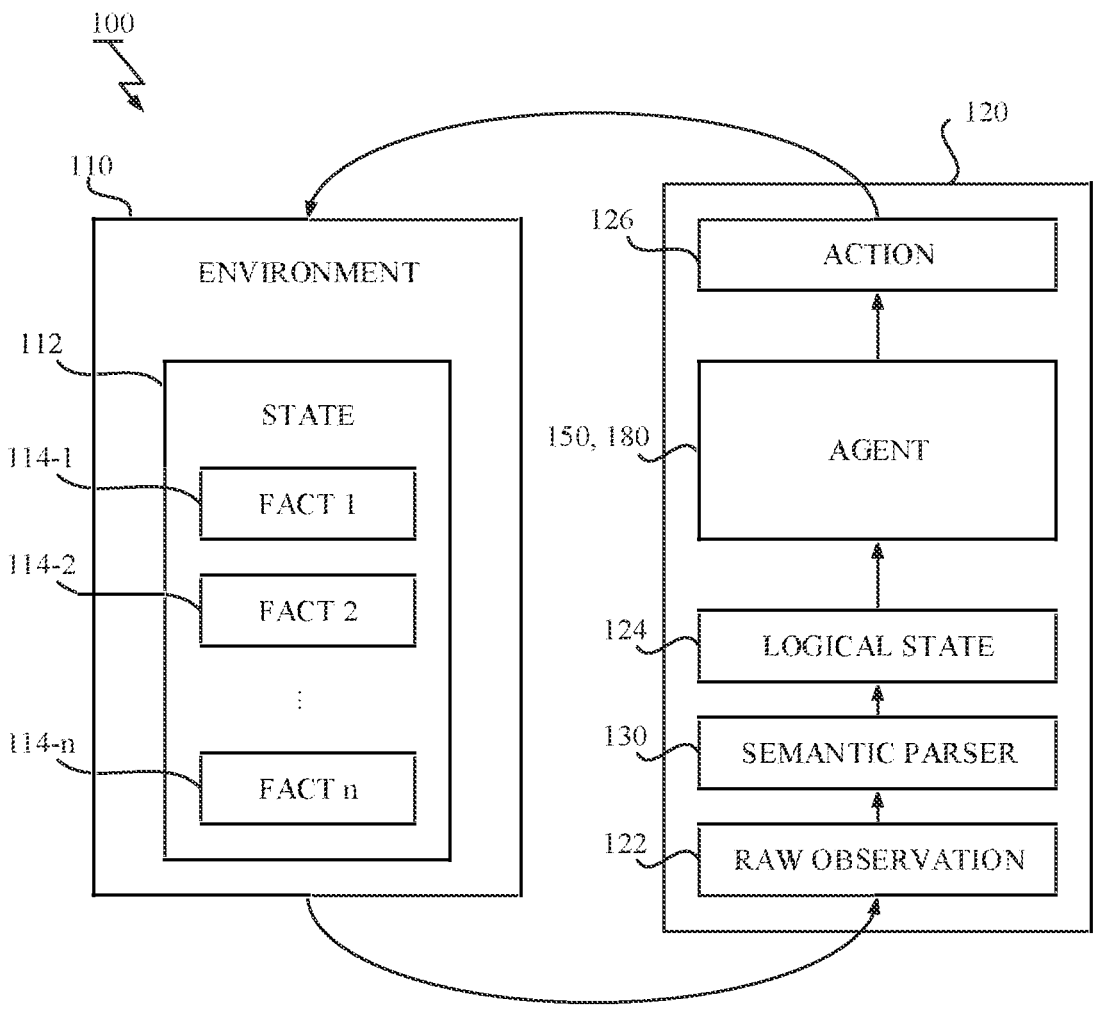
FIG. 1 shows a schematic of a framework and a problem setting for a reinforcement learning system implementing an operator learning module according to an illustrative embodiment.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

As used herein, the term "classical planning", for example, as referring to a classical planning algorithm, refers a form of automated planning that assumes a static, deterministic and fully observable environment, where a solution plan amounts to a sequence of actions. Examples of classical planning algorithms include forward search planning algorithms, iterated width algorithms, subgoal partitioning and resolution in planning (SGPlan), fast forward planning algorithm, or the like.

Classical planning algorithms can produce a path from a given initial state to a goal state when the model of the world is known. However, in several interesting problems, the model of the world is incomplete. This may be due to inherent partial observability in the state or incorrectly learned transition models in the case of model-based reinforcement learning.

Presently, there are no robust methods for enabling classical planning in interactive environments with incomplete models.

One or more embodiments according to the present disclosure are directed to a computer-implemented method, a computer system and a computer program product for enabling classical planning in an interactive environment with incomplete models. In one or more embodiments, a computed operator may be used by a planner (e.g., a PDDL (Planning Domain Definition Language) planner) and the planner may be used for solving the planning problem or may be used by an agent in a model-based reinforcement learning framework where the agent takes an action inferred by the planner and obtains a state generated by a semantic parser that converts raw observations from the environment into the state in a logical form.

In one or more embodiments, the operator includes a precondition that needs to be valid to execute an action of the operator and affect a changing state when the action of the operator is executed. The precondition and the effect may be written in a predicate logic language. In a particular embodiment, the operator has an operator predicate (e.g., move) and one or more parameters (e.g., a, b, c). Note that the operator is lifted and becomes an action (e.g., move (disc1, disc2, peg3)) once the one or more parameters are grounded on one or more actual objects (e.g., disc1, disc2, peg3).

In one or more embodiments, the computer-implemented method may include at least one of preparing a set of examples (D={(s, a, s')}) each including a base state (s), an action (a) and a next state (s') after performing the action (a) in the base state (s); performing variable lifting (e.g., replacing an actual object (e.g., disc1) with an abstract variable (e.g., v1)) in relation to the set of examples (D); computing a validity label (e.g. valid or invalid) for each example (e.g., (s, a)) in the set of examples (D); training a model (e.g., a neural network, a logistic regression, etc.) that is configured to receive an input state (e.g., Boolean value of every possible proposition for the lifted, grounded or mixed state) and a representation of an input action (e.g. a one-hot encoding of the operator) and output at least validity (e.g. [0,1]) of the input action for the input state, by using the set of examples (D) with the validity label; outputting the precondition of the operator (e.g., a PDDL precondition) based on the model; and outputting the effect of the operator (e.g., a PDDL effect).

With reference to FIG. 1, a schematic of a framework and a problem setting for a reinforcement learning system according to an exemplary embodiment of the present invention is described. The reinforcement learning system 120 according to the exemplary embodiment implements a mechanism (an operator learning module) for inferring, computing and/or learning a lifted operator, which can be used by a planner built in an agent of the reinforcement learning.

As shown in FIG. 1, there is an environment 110 where an agent of the reinforcement learning system 120 works. As shown in FIG. 1, the environment 110 has a state 112 that can be sufficiently approximated as a set of logical facts 114-1-114-$n$ where n is the number of logical facts 114. The environment 110 represents a task or simulation which is to be solved by the agent of the reinforcement learning system 120.

For instance, in the case of conversational agents/chatbots, the environment may be the human customers asking for technical assistance. In the case of robotic arm manipulation, the agent may be a controller of a robotic arm and the environment may be an entire system including the robotic arm and its surroundings such as workpieces and obstacle. In the case of autonomous driving, the agent may be a driver of an automobile and the environment 110 may be an entire system including the automobile and its surroundings such as roads, obstacle, and the like. Examples of the environment are not limited and include any environment that can be a target of the reinforcement learning in the technology field.

The reinforcement learning system 120 shown in FIG. 1 includes further a semantic parser 130 in addition to the agent. The agent obtains an observation of the environment 110 through the semantic parser 130. The observation inputted to the reinforcement learning system 120 is referred to as a raw observation 122. Examples of the raw observation 122 may include, but are not limited to, images, texts, sensor outputs, and the like, which can be obtained from the environment 110 by using an appropriate interface and/or devices.

For instance, in the case of conversational agents/chatbots, raw observations are a natural language description of the technical problem. In the case of robotic arm manipulation, the raw observation 122 may include signals from sensors such as torque meters and encoders, to name but a few. In the case of the autonomous driving, the raw observation 122 may include indicators of a speed meter and other instruments, images taken with an in-vehicle camera and/or signals from sensors.

The semantic parser 130 converts the raw observation 122 into a logical form, that is referred to as a logical state 124. The semantic parser 130 implements a method for converting a human-readable representation to a machine-readable format. The semantic parser 130 may include a neural network that may be trained for handling a specific application in deep learning methodology, for instance.

The agent can obtain the logical state 124 from the environment 110 via the semantic parser 130 and can take an action 126 based on a policy, which is an action selection rule for the agent. Examples of the action 126 may include, but are not limited to, any control parameters, which can be submitted to the environment 110 by using an appropriate interface and/or devices.

For instance, in the case of conversational agents/chatbots, the agent outputs a series of intervention actions to recommend to the human. In the case of the robotic arm manipulation, the action may include parameters for control actuators in the robotic arm, to name but a few. In the case of the autonomous driving, the action may include depressing a brake pedal, depressing an accelerator pedal, steering a steering wheel, or the like.

In FIG. 1, the agent has two numerals assigned thereto: one is 150 for representing an agent that learns the operator by interacting with the environment 110 and other is 180 for representing an agent that tries to solve the task of the environment 110 by using the learned operator.

Figure 2:
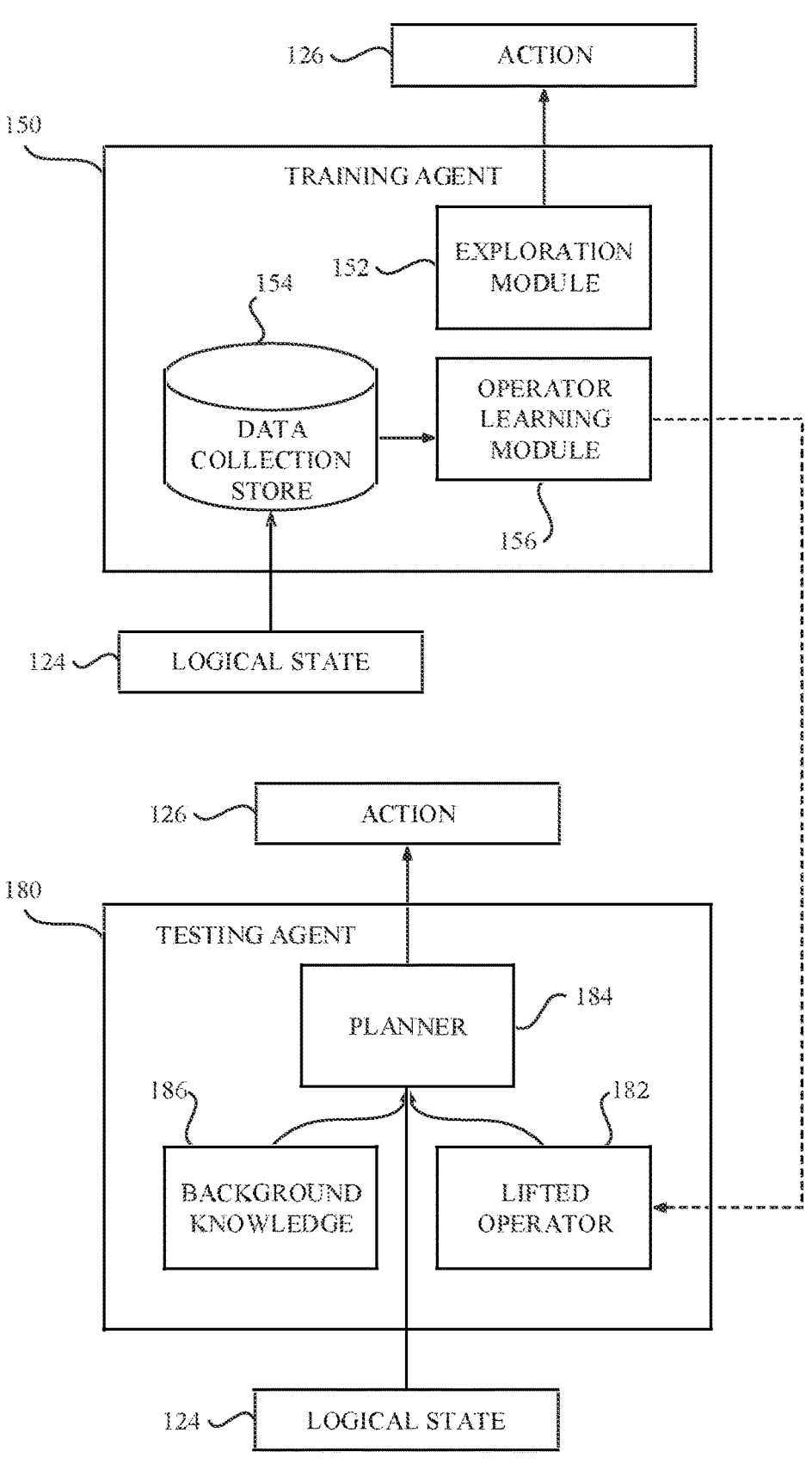
FIG. 2 illustrates schematics of training and testing agents used in a reinforcement learning system according to an illustrative embodiment.

With reference to FIG. 2, schematics of training and testing agents used in the reinforcement learning system according to the exemplary embodiment of the present disclosure are described. In the reinforcement learning system 120 according to the exemplary embodiment, there are at least two agents, including a training agent 150 and a testing agent 180.

The training agent 150 is configured to collect training examples and learn the best way to interact with the environment 110 by taking the action 126 and observing the result of the action 126, which is observed as the raw observation 122 and then converted into the logical state 124 by the semantic parser 130. The task of the training agent 150 is to learn from the logical state 124 with a noise and produce a model for selecting good action in the environment 110.

The training agent 150 may include an exploration module 152, a data collection store 154 and an operator learning module 156.

The exploration module 152 is configured to explore action and state spaces in the environment 110 and prepare a set of training examples. The set of training examples may be acquired by repeatedly taking an action in a current state and observing a resultant state after the action in a manner based on an exploration policy. Examples of the exploration policy may include, but is not limited to, a random policy, a learned policy based on past learning results and a combination thereof. Each training example in the set may include an action (a), a base state (s; a state before an action) and a next state (s'; a state after performing the action in the base state (s)).

The data collection store 154 is configured to store the set of training examples that are collected by the exploration module 152. The data collection store 154 is provided by any internal or external storage (e.g., memory, persistence storage) in a computer system.

The operator learning module 156 is configured to perform operator learning to infer a lifted operator 182 for the environment 110, which will be used by the testing agent 180. The operator learning module 156 will be described in more detail later.

The testing agent 180 is configured to execute actions in the environment 110 in a manner based on the learned knowledge, especially the lifted operator 182 learned by the operator learning module 156 of the training agent 150.

The testing agent 180 may include the lifted operator 182 provided by the training agent 150 and a planner 184, which can solve a planning problem described by an appropriate planning language such as PDDL. The lifted operator 182 is generated by the operator learning module 156 in an appropriate format (e.g., PDDL format), so the planner 184 can process the lifted operator 182. The planner 184 plans over the lifted operator 182 and generate a sequence of actions based on the lifted operator 182.

In a particular embodiment, the testing agent 180 may further include background knowledge 186 and the planner 184 utilizes the background knowledge 186 in combination with the learned lifted operator 182 to take the action 126. The background knowledge 186 may include any given knowledge about the environment 110. For example, the background knowledge 186 may be in the form of a set of constant propositions that should appear in the states or a partially specified operator model that can then be combined with the learned operator models. Having this logical representation of the state provides an insertion point for external knowledge.

Since the training agent 150 takes noisy logical states as input by interacting with the environment 110, the system is at the intersection of the model-based reinforcement learning and the planning problem. The framework shown in FIG. 1 and FIG. 2 is a two-stage process where the semantic parser 130 converts the raw observation 122 into the noisy logical state 124 and the training agent 150 learns from the noisy logical state 124 to generate the lifted operator 182. This approach is to formulate the learned model as lifted operators of the planning problem, thereby allowing us to use the planner 184 that can provide guarantees about consistency, safety and optimality.

The reinforcement learning system 120 according to the exemplary embodiment of the present invention can be said as a model-based reinforcement learning system since the transition dynamics of the environment 110 is modeled as the lifted operator 182 for the planning problem. Also, the reinforcement learning system 120 can be considered a relational reinforcement learning system since the states and the actions have 'relational' representations (i.e., predicate logic).

Figure 3:
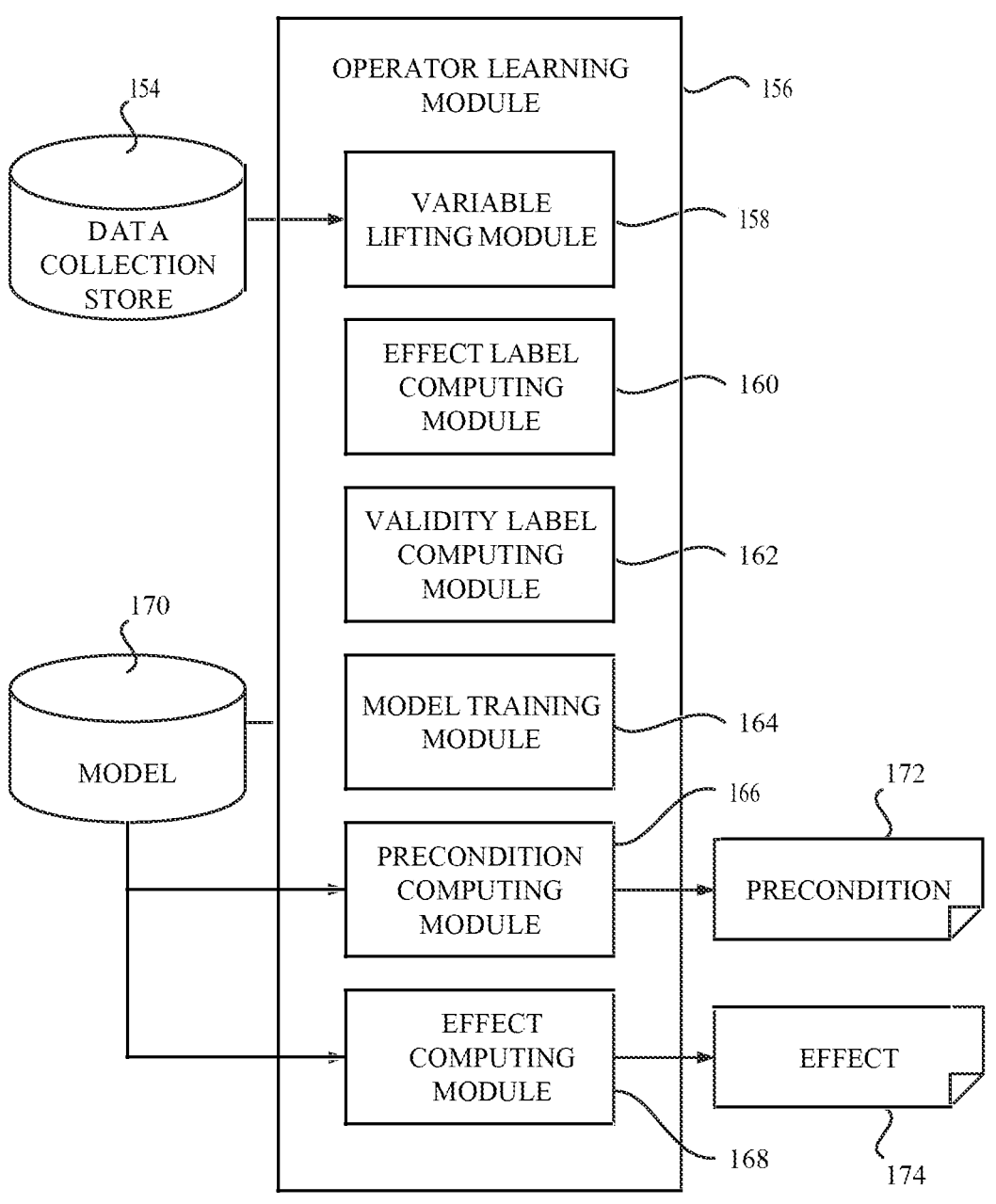
FIG. 3 illustrates a schematic of an operator learning module in a training agent used in a reinforcement learning system according to an illustrative embodiment.

With reference to FIG. 3, a schematic of the operator learning module 156 in the training agent 150 according to the exemplary embodiment of the present disclosure is described. The operator learning module 156 shown in FIG. 3 may include a variable lifting module 158; an effect label computing module 160; a validity label computing module 162; a model training module 164 for training a model 170; a precondition computing module 166 for computing the precondition based on the trained model 170; and an effect computing module 168 for computing the effect based on the trained model 170.

The operator learning module 156 is configured to output a lifted operator based on the set of training examples stored in the data collection store 154. The operator learned by the operator learning module 156 may include a single operator or a plurality of individual operators. The number of operators to be learned may depend on the specifics of the environment 110. Each operator may have an operator predicate and one or more parameters and may be a precondition 172 and an effect 174. The precondition 172 may include a list of lifted propositions to be valid for execution of an action of the operator. The effect 174 includes a list of changes in a lifted state after performing an action of the operator. The precondition and the effect of the operator are used by the planner 184. Outputting the lifted operator includes any form of outputting and may include saving the data of the lifted operator to a storage medium, sending the data of the lifted operator to other component, displaying the lifted operator on a display device, and/or printing the data of the lifted operator from the printer, or the like.

Hereinbelow, before describing each module in the operator learning module 156, the problem setting, and formulation will be described in more detail. Consider a deterministic environment E that is based on an internal logic state z (z∈S; the internal logical state z is a member of the set of internal logical states S) or can be approximated as such. Here, the logical state is defined to have a predicate function grounded on some objects. For example, a logical state 'on (disc1, peg1)' is a proposition composed of the predicate 'on', grounded on the two objects 'disc1' and 'peg1'. The full logical state of the environment E is defined as a conjunction of Boolean value of every proposition at a given time.

Note that in the described embodiment the basic reinforcement learning problem setting where the agent interacts with environment E by performing the actions a (a∈A; the action a is a member of the set of possible actions A), based on the observation o (o∈O; the observation o is a member of the set of possible observations O) is kept. The environment E transitions the state based on the action taken such that the dynamics of the next state is determined according to z'=T(z, a).

Two particularities of the problem setting are now added onto the base setting. First, it is assumed that the semantic parser 130 is good but imperfect and produces approximates of the state s from the observation o, that is s=φ(o). Second, the environment dynamics T can be re-formulated as a planning operator with a precondition and an effect. The operator learning module 156 learns the model (i.e., the lifted operator) from the set of training examples (s, a, s') ((s, a, s')∈S×A×S; the training example (s, a, s') is a member of a product of sets S×A×S). Note that the training agent 150 can only collect the approximates of the state s instead of the actual internal state z.

A training example is valid if the internal state z respects the preconditions of the action a, and from the application of the effects the stage z becomes z' (z is not equal to z'). By extension, valid actions relative to the validity can be defined.

As discussed above, classical planning algorithms can produce a path from a given initial state to a goal state when the model of the world is known. However, when the model of the world is incomplete, due to, for example, inherent partial observability in the state or incorrectly learned transition models in the case of model-based reinforcement learning, classical planning may prove unsuccessful when there is no direct path from the current state s to the goal state s'. For example, observations may be limited to some parameters (e.g., the current room).

Accordingly, aspects of the present disclosure provide an agent with the ability to perform classical planning under a partially observable state space. The present disclosure, as discussed in greater detail below, can use an information gathering policy to gather information about the world when there is no direct path from the current state to the goal state and the agent may be able to maintain a history of observations (or belief states) to solve the problem.

The approach to enable classical planning in interactive environments with incomplete models includes two aspects. First, the approach can maintain a history of logical states as the belief state. The system can assume that states do not transition if a transition is not observed, where the set of logical states can be equivalently defined as a "knowledge graph" of the observed world. The second part of the approach can train an "information gathering policy" from the given training set, where the agent is provided a reward goal to maximize "information gain" as an "intrinsic reward", where the reward equals change in the size of the knowledge graph.

In an example of a text based game, such as TextWorld Commonsense (TWC), the system can mainly use the action words as the "features" for learning the information gathering policy where the hypothesis is that some actions in text-based games are highly correlated to information gathering. For example, if the action "go to x room" reveals a lot of new objects, the agent may receive an information gathering reward based on increase of the size of the knowledge graph due to the newly acquired knowledge.

In some embodiments, it can be assumed that these "information gathering actions" have effects that can be reverted by other actions of the agent. For example, if a door suddenly closes permanently when going to another room, then this action is not reversible anymore. Typically, however, the agent will assume that such information gathering actions can be reversed.

A goal of the agent is to learn to predict how much an action can gather useful information for planning. For a classical planning problem, the agent can switch between two modes: a) a probabilistically planning mode or b) an information gathering mode. The agent can compute a predictive state representation given the history of observations and actions taken. Action candidates can be scored based on planning with the predictive state so that the first actions with resolved plans with high confidence are scored high.

The agent can score action candidates based on a Q function of the value of expected information to be gathered from a given pair of state and action. The Q function is learned from trajectories in the environment. An increase in "belief state certainty" can be given as a reward. In a given environment, an information gathering subproblem can be defined where an Information Gathering (IG) policy for this subproblem is learned. When a path cannot be found in the classical planning problem, the IG policy is used. To learn the IG policy, the subproblem is defined by quantitative and qualitative measures of information gain in the context of using the classical planner for problem solving.

The completeness/optimality of several classical planning algorithms can be retained while expanding their applicability to a new set of problems. This process can perform better than either RNN-based deep RL methods or planning on the belief state alone.

Figure 4:
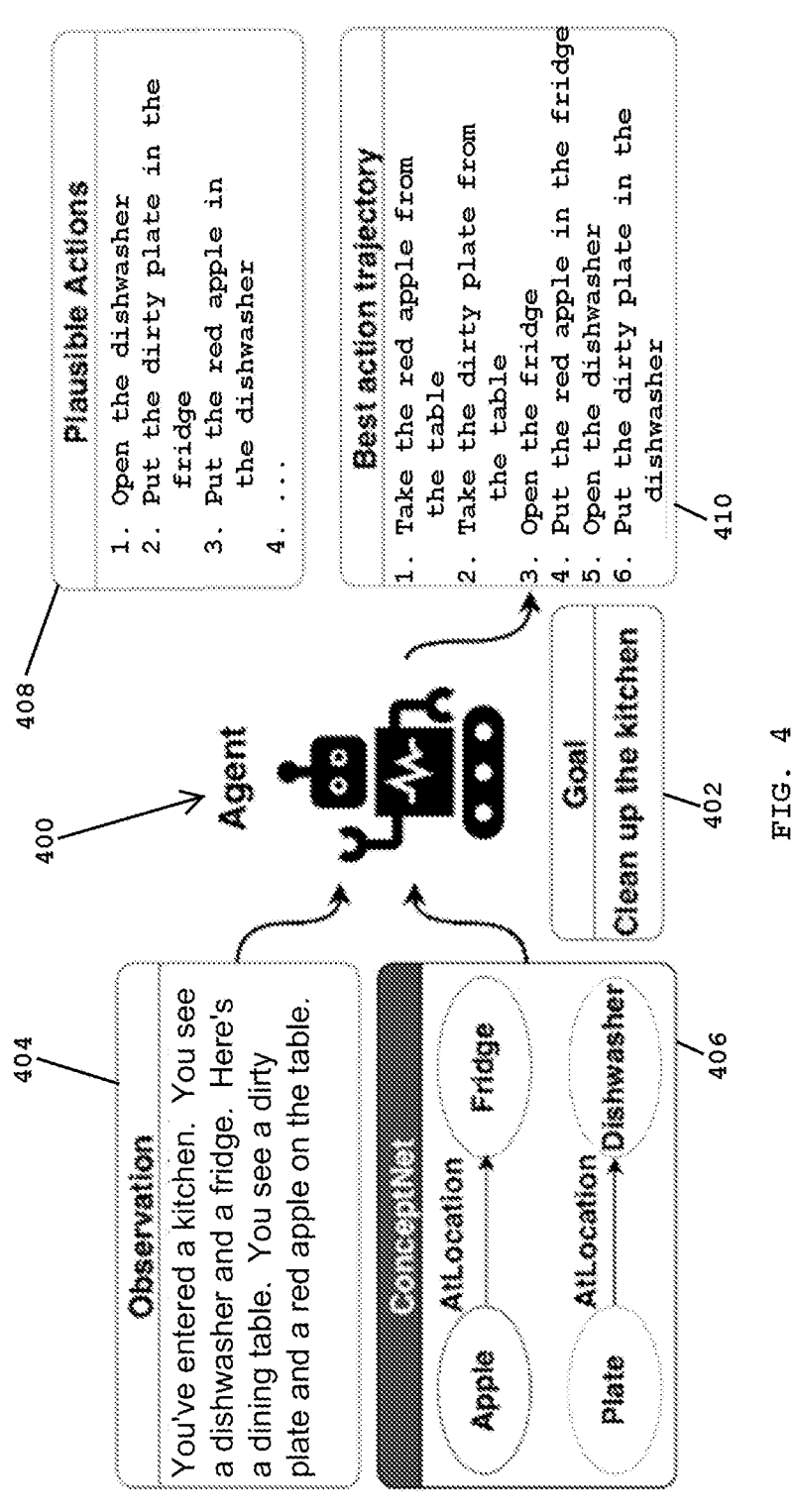
FIG. 4 illustrates a schematic representation of an agent in a game environment where the environment is fully observable, according to an illustrative embodiment.
Figure 5:
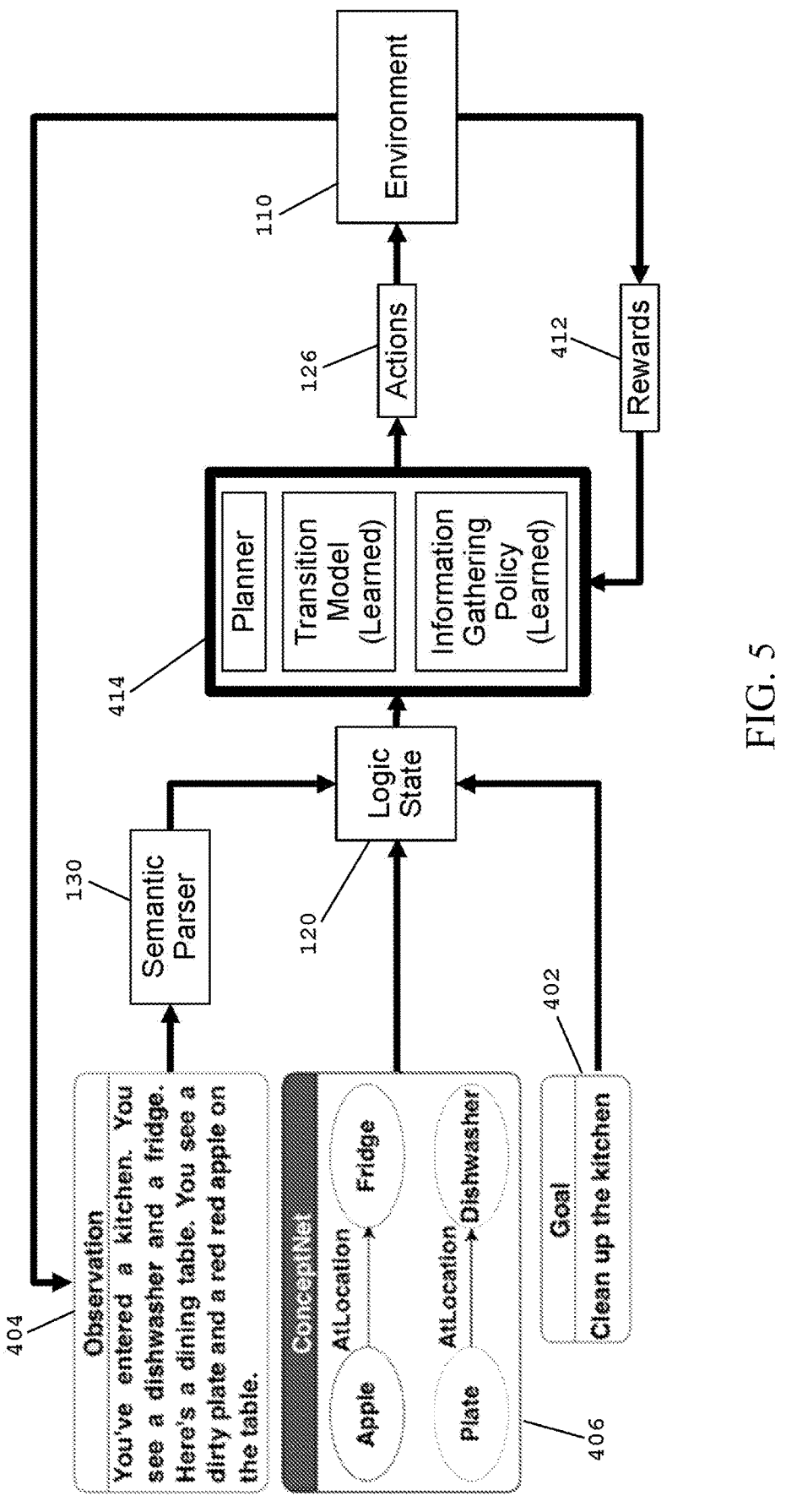
FIG. 5 illustrates a model-based reinforcement learning setup with planning and an information gathering policy, according to an illustrative embodiment.

FIGS. 4 and 5 represent an example within TWC. An agent 400 can be provided with a goal 402 to clean up the kitchen. In this game, a text based observation 404 is provided to the agent, stating that the agent has entered a kitchen, a dishwasher and a refrigerator can be seen, along with a dirty plate and a red apple on the table. The agent 400 may determine several plausible actions 408, including (1) open the dishwasher; (2) put the dirty plate in the refrigerator; (3) put the red apple in the dishwasher; and the like. The agent 400 may have previously learned knowledge 406 that the apple can be in the refrigerator and the plate can be in the dishwasher for a cleaned up kitchen. In this state, where a complete model of the environment can be observed, the agent 400 can determine a best action trajectory 410 that includes (1) take the rad apple from the table; (2) take the dirty plate from the table; (3) open the refrigerator; (4) put the red apple in the refrigerator; (5) open the dishwasher; and (6) put the dirty plate in the dishwasher.

Figure 6:
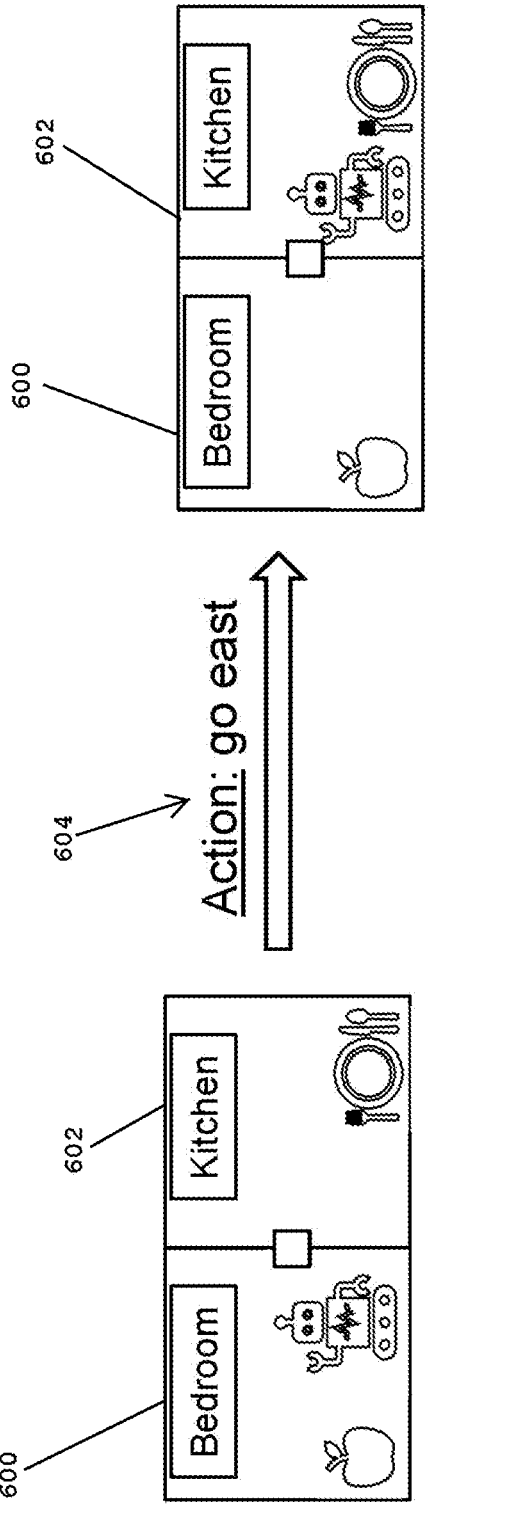
FIG. 6 illustrates a schematic representation of an agent in a game environment where the environment is partially observable, according to an illustrative embodiment.

However, as shown in FIG. 6, the agent 400, given the goal state to put the apple on the plate, may be in a bedroom 600 and can only observe the apple. Classical planning to satisfy the goal state is not possible under the current model of the environment. In this case, because classical planning cannot complete the goal state, the agent 400 can move into the information gathering mode, running a policy to maximize information gain. Under this mode, the agent 400 may take an action 604 to move into the kitchen 602, where the plate can be observed. An intrinsic reward 412 (see FIG. 5) is provided to the agent 400, as the knowledge graph of the agent has grown larger, gaining the knowledge that the plate is in the kitchen. Because the agent 400, as discussed above, can maintain a history of observations (or belief states), the agent 400 can return to its previous state (in the bedroom 600) to retrieve the apple, and then, using the previously acquired information, can move into the kitchen 602 to place the apple on the table and thus, achieve the goal state.

The Table below illustrates a KG-A2C agent (which is an agent that builds a dynamic knowledge graph while exploring and generates actions using a template-based action space) approach, an approach from the baselines of Text-World Commonsense (TWC) that uses deep reinforcement learning and having access to more information such as a manual, a classical planning algorithm with random information gathering approach, and a classical planning with learned information gathering (according to the present disclosure) approach compare in playing easy level, medium level and hard level games. The number of steps is shown along with the score (a score of 1.0 is the maximum score). The table below also shows, for reference, how a human performed at these games and also the maximum obtainable score.

state of the world. This policy can provide an information gathering mode that can be used by the agent to increase its knowledge in efforts to achieve a goal state. An information gain reward can be defined based on a local measure of information gain between the current and the next state of the world, for example, using the number of novel facts in the new state as compared to the old state. The process 700 can further include an act 706, where an online replanning framework can switch between the classical planning mode and the information gathering mode.

The process 700 can include at act 708 where a learning algorithm learns/updates action models using previous interactions with the environment. The process 700 can further include an act 710 where a Q-learning algorithm learns, from rewards obtained during an interaction, a value function that scores state-action pairs.

Example Computing Platform

Various aspects of the present disclosure are described by narrative text, flowcharts, block diagrams of computer systems and/or block diagrams of the machine logic included in

TABLE 1

| | Easy-level #Steps (Score) | | Medium-level #Steps (Score) | | Hard-level #Steps (Score) | |
|---|---|---|---|---|---|---|
| KG-A2C | 18.00 ± 3.24 | (0.87 ± 0.05) | 43.08 ± 4.13 | (0.54 ± 0.17) | 49.96 ± 0.00 | (0.22 ± 0.00) |
| TWC + Nb + Manual | 18.24 ± 4.63 | (0.83 ± 0.09) | 30.12 ± 4.62 | (0.84 ± 0.03) | 49.99 ± 0.02 | (0.22 ± 0.05) |
| Planning + Random IG | 2.40 ± 0.00 | (1.00 ± 0.00) | 3.60 ± 0.00 | (1.00 ± 0.00) | 31.28 ± 7.30 | (0.63 ± 0.06) |
| Planning + Learned IG | 2.40 ± 0.00 | (1.00 ± 0.00) | 3.60 ± 0.00 | (1.00 ± 0.00) | 14.40 ± 0.02 | (1.00 ± 0.00) |
| Human (reference) | 2.4 ± 0.75 | (1.00 ± 0.00) | 4.40 ± 1.85 | (1.00 ± 0.00) | 17.67 ± 3.31 | (1.00 ± 0.00) |
| Maximal (reference) | 2.00 ± 0.00 | (1.00 ± 0.00) | 4.40 ± 1.14 | (1.00 ± 0.00) | 14.60 ± 2.67 | (1.00 ± 0.00) |

As can be seen, the approach of the present disclosure (Planning+Learned IG) resulted in the best results, where this approach obtained the best result in the hard level game. With learned information gathering, the agent can learn what actions result in maximum the intrinsic reward of gaining knowledge. Further, by maintaining a history of its knowledge, the agent can take actions that move the agent toward the goal state, even when the available observations provide an incomplete model of the environment.

Example Process

Figure 7:
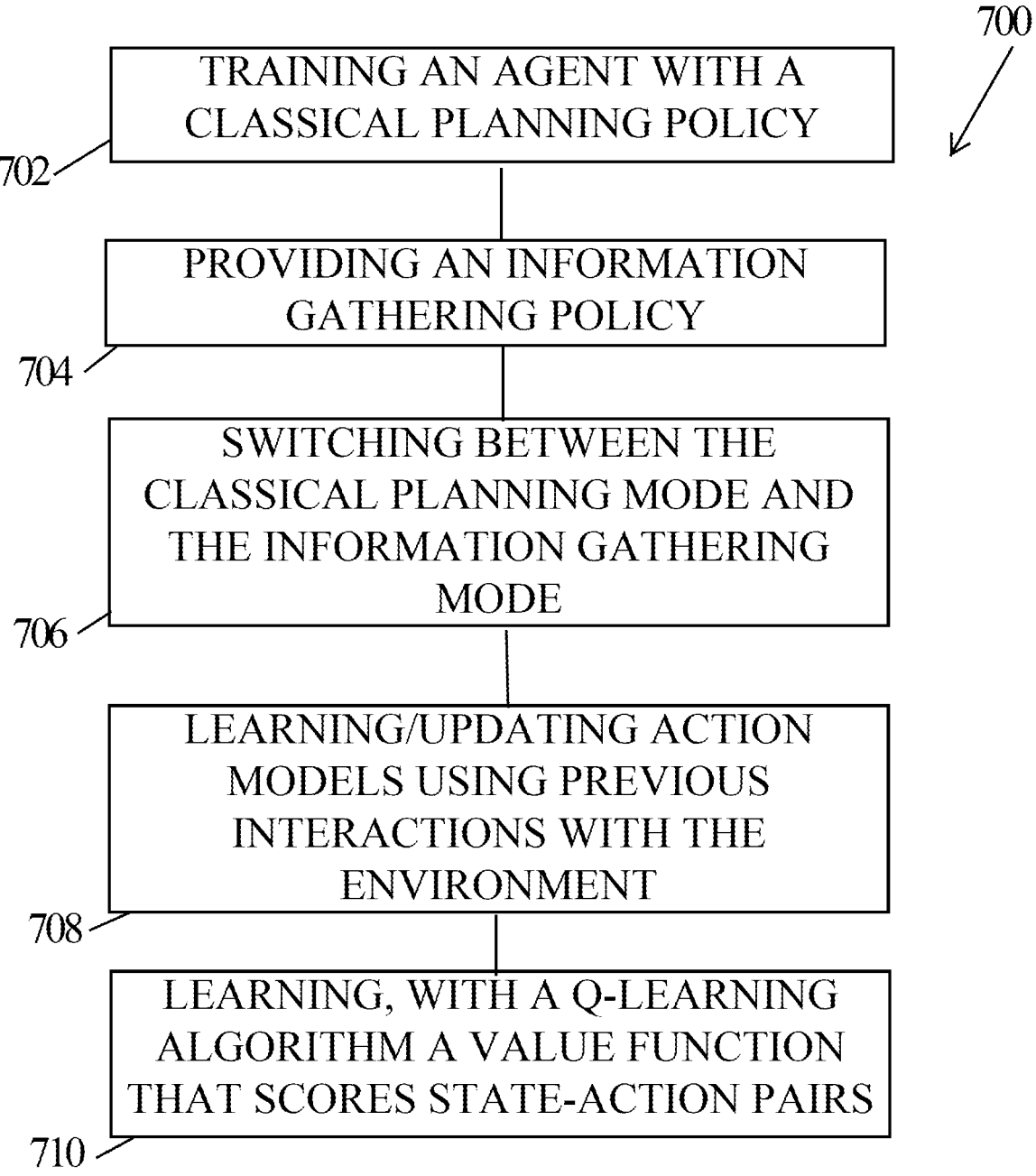
FIG. 7 illustrates a flow chart describing a method for enabling classical planning in an interactive environment with incomplete models, according to an illustrative embodiment.

It may be helpful now to consider a high-level discussion of an example process. To that end, FIG. 7 presents an illustrative process 700 related to the method for planning in interactive environments with partial observability and incomplete models. Process 700 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

Referring to FIG. 7, an act 702 of process 700, can include training an agent with a classical planning policy. This policy can provide a classical planning mode that can produce a path from a given initial state to a goal state when the model of the world is known. An act 704 can further provide an information gathering policy that was trained to take actions that increase the knowledge about the current computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 8, computing environment 800 includes an example of an environment for the execution of at least some of the computer code involved in performing the inventive methods, such as new reinforcement learning code enabling classical planning in interactive environments with incomplete models block 900. In addition to block 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 900, as identified above), peripheral device set 814 (including user interface (UI) device set 823, storage 824, and Internet of Things (IOT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 900 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 900 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Importantly, although the operational/functional descriptions described herein may be understandable by the human mind, they are not abstract ideas of the operations/functions divorced from computational implementation of those operations/functions. Rather, the operations/functions represent a specification for an appropriately configured computing device. As discussed in detail above, the operational/functional language is to be read in its proper technological context, i.e., as concrete specifications for physical implementations.

Accordingly, one or more of the methodologies discussed herein may obviate a need for time consuming data processing by the user. This may have the technical effect of reducing computing resources used by one or more devices within the system. Examples of such computing resources include, without limitation, processor cycles, network traffic, memory usage, storage space, and power consumption.

It should be appreciated that aspects of the teachings herein are beyond the capability of a human mind. It should also be appreciated that the various embodiments of the subject disclosure described herein can include information that is impossible to obtain manually by an entity, such as a human user. For example, the type, amount, and/or variety of information included in performing the process discussed herein can be more complex than information that could be reasonably be processed manually by a human user.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method in a model-based reinforcement learning (RL) system with logic states, the computer-implemented method comprising:

switching an agent between a first mode and a second mode, the first mode being a probabilistic planning mode and the second mode being an information gathering mode, wherein in the probabilistic planning mode, the agent:

computes a predictive state representation based on historical observations and historical actions taken by the agent; and scores action candidates based on planning with the predictive state representation such that one or more first actions with resolved plans and with confidence to achieve a goal state are scored higher than one or more second actions without the resolved plans, wherein the action candidates include the one or more first actions and the one or more second actions; and in the information gathering mode, the agent:

scores the action candidates based on a Q function of a value of expected information to be gathered from a given pair of state and action; and performs one or more information gathering actions from the scored action candidates based on an intrinsic reward of each action of the one or more information gathering actions, wherein among the scored action candidates, the one or more information gathering actions provide a maximum increase in knowledge about a current state of an interactive environment, the intrinsic reward of each action of the one or more information gathering actions corresponds to an amount of increase in the knowledge based on the performing of a respective action of the one or more information gathering actions, and the agent interacts with the interactive environment.

2. The computer-implemented method according to claim 1, wherein the Q function is learned from trajectories in the interactive environment, and an increase in a belief state certainty associated with the agent is given as the intrinsic reward.

3. The computer-implemented method according to claim 2, wherein the intrinsic reward is an information gain reward based on a local measure of information gain between the current state and a next state of the interactive environment.

4. The computer-implemented method of claim 3, wherein the information gain reward uses a number of novel facts in the next state compared to the current state.

5. The computer-implemented method according to claim 1, wherein, in a situation where a path cannot be found in a classical planning problem, the agent switches from the probabilistic planning mode to the information gathering mode.

6. The computer-implemented method according to claim 1, wherein the agent is provided with the goal state, and the agent is in the interactive environment with partial observability without a path to reach the goal state.

7. The computer-implemented method according to claim 1, wherein the agent is provided with the goal state, and the agent is in an incomplete model that precludes a path to reach the goal state.

8. The computer-implemented method according to claim 1, further comprising learning or updating, with a learning algorithm, action models within the probabilistic planning mode using one or more previous interactions with the interactive environment.

9. The computer-implemented method according to claim 1, wherein an initial action model of the interactive environment is given to the agent by one or more domain experts.

10. A computer-implemented method for planning in an interactive environment with partial observability and incomplete models, the computer-implemented method comprising:

producing, with a classical planning algorithm, a path from a given initial state to a goal state based on a model of a world being known to an agent;

learning, with a Q-learning algorithm, from rewards obtained during an interaction, action candidates gathered from a value function that scores state-action pairs, wherein the action candidates are scored based on the value function;

performing, using an information gathering policy, one or more information gathering actions from the scored action candidates based on an intrinsic reward of each action of the one or more information gathering actions, wherein among the scored action candidates, the one or more information gathering actions provide a maximum increase in knowledge about a current state of the interactive environment, the intrinsic reward of each action of the one or more information gathering actions corresponds to an amount of increase in the knowledge based on the performing of a respective action of the one or more information gathering actions, and the agent interacts with the interactive environment; and switching, with an online replanning framework, between using the classical planning algorithm and using the information gathering policy based on a current model of the world.

11. The computer-implemented method of claim 10, further comprising learning or updating, with a learning algorithm, action models within the classical planning algorithm using one or more previous interactions with the interactive environment.

12. The computer-implemented method according to claim 10, wherein an initial action model of the interactive environment is given to the agent by one or more domain experts.

13. The computer-implemented method of claim 10, wherein the Q-learning algorithm is learned from trajectories in the interactive environment; and an increase in a belief state certainty associated with the agent is given as the intrinsic reward.

14. The computer-implemented method according to claim 13, wherein the intrinsic reward is an information gain reward defined based on a local measure of information gain between the current state and a next state of the interactive environment.

15. The computer-implemented method of claim 14, wherein the information gain reward uses a number of novel facts in the next state compared to a number of facts known in the current state.

16. A non-transitory computer readable storage medium tangibly embodying a computer readable program code having computer readable instructions that, when executed, causes a computer device to carry out a method for planning in an interactive environment with partial observability and incomplete models, the method comprising:

producing, with a classical planning algorithm, a path from a given initial state to a goal state based on a model of a world being known to an agent;

learning, with a Q-learning algorithm, from rewards obtained during an interaction, action candidates gathered from a value function that scores state-action pairs, wherein the action candidates are scored based on the value function;

performing, using an information gathering policy, one or more information gathering actions from the scored action candidates based on an intrinsic reward of each action of the one or more information gathering actions, wherein among the scored action candidates, the one or more information gathering actions provide a maximum increase in knowledge about a current state of the interactive environment, the intrinsic reward of each action of the one or more information gathering actions corresponds to an amount of increase in the knowledge based on the performing of a respective action of the one or more information gathering actions, and the agent interacts with the interactive environment; and switching, with an online replanning framework, between using the classical planning algorithm and using the information gathering policy based on a current model of the world.

17. The non-transitory computer readable storage medium of claim 16, the method further comprising learning or updating, with a learning algorithm, action models within the classical planning algorithm using one or more previous interactions with the interactive environment.

18. The non-transitory computer readable storage medium of claim 16, the method further comprising giving an initial action model of the interactive environment to the agent by one or more domain experts.

19. The non-transitory computer readable storage medium of claim 16, wherein the Q-learning algorithm is learned from trajectories in the interactive environment, and an increase in a belief state certainty associated with the agent is given as the intrinsic reward.

* * * * *